US012563294B2

(12) United States Patent
Hirata et al.

(10) Patent No.: US 12,563,294 B2
(45) Date of Patent: Feb. 24, 2026

(54) ROAD CURVATURE ESTIMATION DEVICE

(71) Applicant: SUBARU CORPORATION, Tokyo (JP)

(72) Inventors: Atsuhiro Hirata, Tokyo (JP); Atsuki Munakata, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 29 days.

(21) Appl. No.: 18/651,212

(22) Filed: Apr. 30, 2024

(65) Prior Publication Data

US 2024/0388799 A1 Nov. 21, 2024

(30) Foreign Application Priority Data

May 15, 2023 (JP) ................................. 2023-079874

(51) Int. Cl.
 *H04N 23/67* (2023.01)
 *G06V 20/56* (2022.01)
 *H04N 23/61* (2023.01)
(52) U.S. Cl.
 CPC ......... *H04N 23/675* (2023.01); *G06V 20/588* (2022.01); *H04N 23/61* (2023.01)
(58) Field of Classification Search
 CPC .... H04N 23/675; H04N 23/61; G06V 20/588; B60W 40/072; B60W 2420/403
 See application file for complete search history.

(56) References Cited

U.S. PATENT DOCUMENTS

| | | | | |
|---|---|---|---|---|
| 8,199,975 B2 * | 6/2012 | Pomerleau | .............. | G06T 7/593 |
| | | | | 382/104 |
| 8,594,370 B2 * | 11/2013 | Schamp | ............... | G06V 10/809 |
| | | | | 382/104 |
| 10,776,635 B2 * | 9/2020 | Berberian | ............ | H04N 13/271 |
| 2012/0249789 A1 * | 10/2012 | Satoh | ........................ | B60R 1/26 |
| | | | | 348/143 |
| 2015/0269446 A1 * | 9/2015 | Takemae | ................... | G06T 7/12 |
| | | | | 382/199 |
| 2018/0162395 A1 * | 6/2018 | Mukai | ................. | B60W 30/146 |
| 2020/0064138 A1 * | 2/2020 | Takahama | .............. | G01C 21/30 |

(Continued)

FOREIGN PATENT DOCUMENTS

JP 2021-128612 A 9/2021

*Primary Examiner* — Gims S Philippe
(74) *Attorney, Agent, or Firm* — TROUTMAN PEPPER LOCKE LLP

(57) ABSTRACT

A road curvature estimation device includes a camera device and a curvature calculation device. The camera device includes an image capturer and a boundary line estimator. The curvature calculation device includes a maximum curvature position detector, a focus position setter, and a focus position curvature calculator. The focus position curvature calculator is configured to compare a maximum curvature position detected by the maximum curvature position detector and a focus position set by the focus position setter. The focus position curvature calculator is configured to, when the focus position is closer to a vehicle than is the maximum curvature position, set a curvature at the focus position as a focus position curvature. The focus position curvature calculator is configured to, when the focus position is ahead of the maximum curvature position, set a curvature at the maximum curvature position as the focus position curvature.

14 Claims, 11 Drawing Sheets

(56) References Cited

U.S. PATENT DOCUMENTS

| 2021/0256274 | A1 | 8/2021 | Kumano et al. | |
| 2021/0295060 | A1* | 9/2021 | Lee ........................... | G06T 7/33 |
| 2023/0011130 | A1* | 1/2023 | Fukasawa ............. | B60W 30/04 |

* cited by examiner

CAPTURED IMAGE

LEFT LANE LINE

RIGHT LANE LINE

TRAVELING LANE x y

BOUNDARY LINE ESTIMATION IMAGE (BLANK)

LEFT BOUNDARY LINE

RIGHT BOUNDARY LINE

TRAVELING LANE x y

ROAD CURVATURE ESTIMATION DEVICE

CROSS-REFERENCE TO RELATED APPLICATIONS

The present application claims priority from Japanese Patent Application No. 2023-079874 filed on May 15, 2023, the entire contents of which are hereby incorporated by reference.

BACKGROUND

The disclosure relates to a road curvature estimation device.

There is known active lane keep (ALK) control in which a vehicle assists a driver who drives the vehicle in steering the vehicle when the vehicle travels straightforward along an expressway or an ordinary road, thereby reducing a burden on the driver. In this type of active lane keep control device, a sensing device such as a camera mounted on the vehicle (on-board camera) acquires information on a traveling environment ahead of the vehicle.

Right and left lane lines that define a lane where the vehicle is traveling (traveling lane) are recognized based on the acquired traveling environment information. Subsequently, a lane width is determined based on a distance between the right and left lane lines. A target traveling road for causing the vehicle to travel at the center of the traveling lane is set based on the lane width. The active lane keep control device performs steering control so that the vehicle travels along the target traveling road.

When the vehicle travels along a curve, the active lane keep control device measures (estimates) the curvatures of the recognized right and left lane lines, and sets a target traveling road along the curve based on the curvatures.

The following technology is also known (e.g., Japanese Unexamined Patent Application Publication No. 2021-128612). Machine learning such as a neural network is used to create image data that defines a traveling lane area and a road area other than the traveling lane area based on an image captured by a camera and showing a view ahead of a traveling vehicle. The curvature of the lane where the vehicle is traveling (traveling lane) is estimated based on the image data.

For example, machine learning is used to estimate, based on image data obtained by a camera as illustrated in FIG. 10A, boundary lines indicating the boundaries between a traveling lane and right and left lane lines that define the traveling lane as illustrated in FIG. 10B. The curvatures of the boundary lines are calculated. Thus, the curvatures can be estimated with high accuracy even if the right and left lane lines that define the traveling lane have faded or part of the lane lines is hidden by an obstacle. The blank part of FIG. 10B represents a space above the horizon.

SUMMARY

An aspect of the disclosure provides a road curvature estimation device including a camera device and a curvature calculation device. The camera device includes an image capturer and a boundary line estimator. The image capturer is configured to capture an image of a view ahead of a vehicle. The boundary line estimator is configured to estimate a boundary line between a lane on a curve ahead of the vehicle and a right or left lane line that defines the lane based on pieces of image data of at least one frame that are obtained by the image capturer. The boundary line estimator is configured to set boundary line positions on the boundary line. The boundary line estimator is configured to calculate respective curvatures at the boundary line positions. The curvature calculation device includes a maximum curvature position detector, a focus position setter, and a focus position curvature calculator. The maximum curvature position detector is configured to detect a maximum curvature position indicating a maximum curvature among the curvatures at the boundary line positions that are calculated by the boundary line estimator. The focus position setter is configured to set a focus position ahead of the vehicle on the boundary line. The focus position curvature calculator is configured to compare the maximum curvature position detected by the maximum curvature position detector and the focus position set by the focus position setter. The focus position curvature calculator is configured to, when the focus position is closer to the vehicle than is the maximum curvature position, set a curvature at the focus position as a focus position curvature. The focus position curvature calculator is configured to, when the focus position is ahead of the maximum curvature position, set the curvature at the maximum curvature position as the focus position curvature.

An aspect of the disclosure provides a road curvature estimation device including a detector and circuitry. The detector is configured to capture an image of a view ahead of a vehicle. The circuitry is configured to estimate a boundary line between a lane on a curve ahead of the vehicle and a right or left lane line that defines the lane based on pieces of image data of at least one frame that are obtained by the detector. The circuitry is configured to set boundary line positions on the boundary line. The circuitry is configured to calculate respective curvatures at the boundary line positions. The circuitry is configured to detect a maximum curvature position indicating a maximum curvature among the calculated curvatures at the boundary line positions. The circuitry is configured to set a focus position ahead of the vehicle on the boundary line. The circuitry is configured to compare the detected maximum curvature position and the set focus position. The circuitry is configured to, when the focus position is closer to the vehicle than is the maximum curvature position, set a curvature at the focus position as a focus position curvature. The circuitry is configured to, when the focus position is ahead of the maximum curvature position, set the curvature at the maximum curvature position as the focus position curvature.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

When a vehicle at high speed enters a curve or is traveling along the curve, the road curvature up to a distant point is accurately acquired to secure traveling stability in active lane keep control.

Figure 11A:
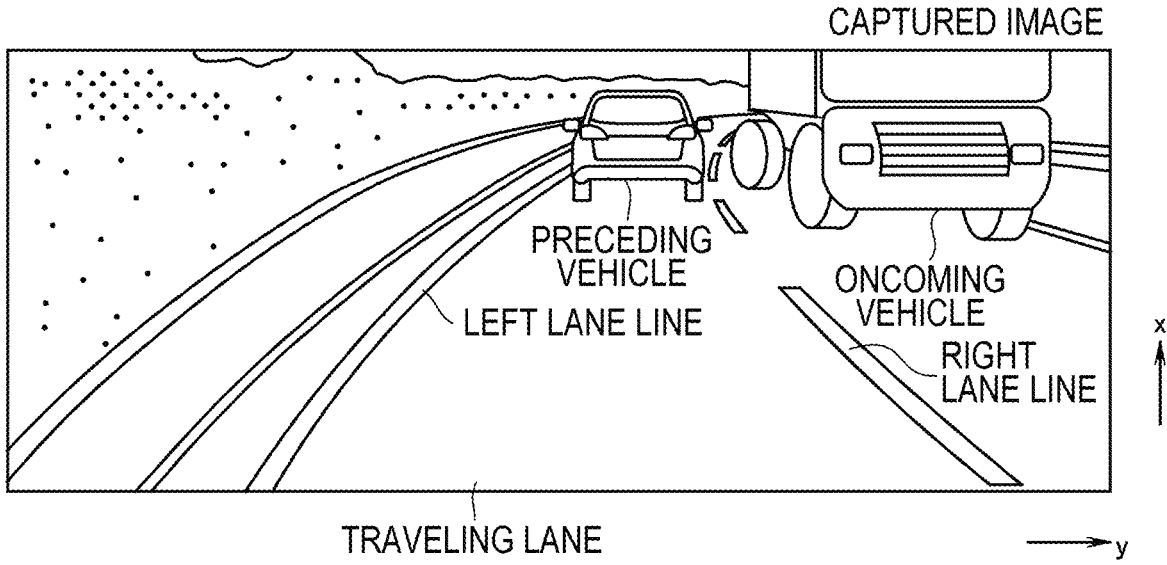
FIG. 11A illustrates a captured image showing a view ahead of a vehicle.
Figure 11B:
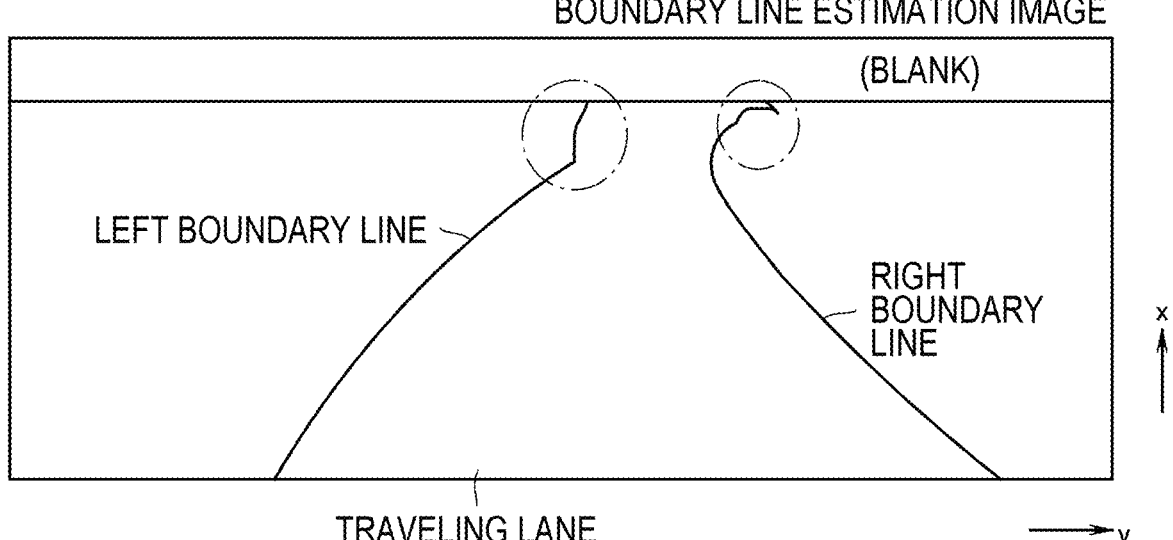
FIG. 11B illustrates an image of boundary lines estimated by machine learning from FIG. 11A.

A captured image illustrated in FIG. 11A shows a preceding vehicle and an oncoming vehicle. In this captured image, part of the lane lines at a distant point is hidden by the preceding vehicle and the oncoming vehicle. If a lane line estimation image is generated based on pieces of image data of at least one frame and the right and left boundary lines are estimated based on the estimation image, the boundary lines may erroneously be recognized as illustrated in FIG. 11B. That is, portions enclosed by chain line circles in the estimation image of the boundary lines in FIG. 11B are portions where the lane lines in the captured image of FIG. 11A are hidden by the preceding vehicle and the oncoming vehicle. For example, the right and left boundary lines may erroneously be recognized on the outside of the preceding vehicle and the oncoming vehicle when the boundary lines are estimated based on image data of one frame or when the lane lines are unclear. The blank part of FIG. 11B represents a space above the horizon.

In this case, the contours on the side of the preceding vehicle and the oncoming vehicle extend upward in the image. Therefore, the curvature at the distant point is smaller than the actual curvature.

It is desirable to provide a road curvature estimation device that can estimate a road curvature with stable accuracy based on image data even if a distant point is unclear.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
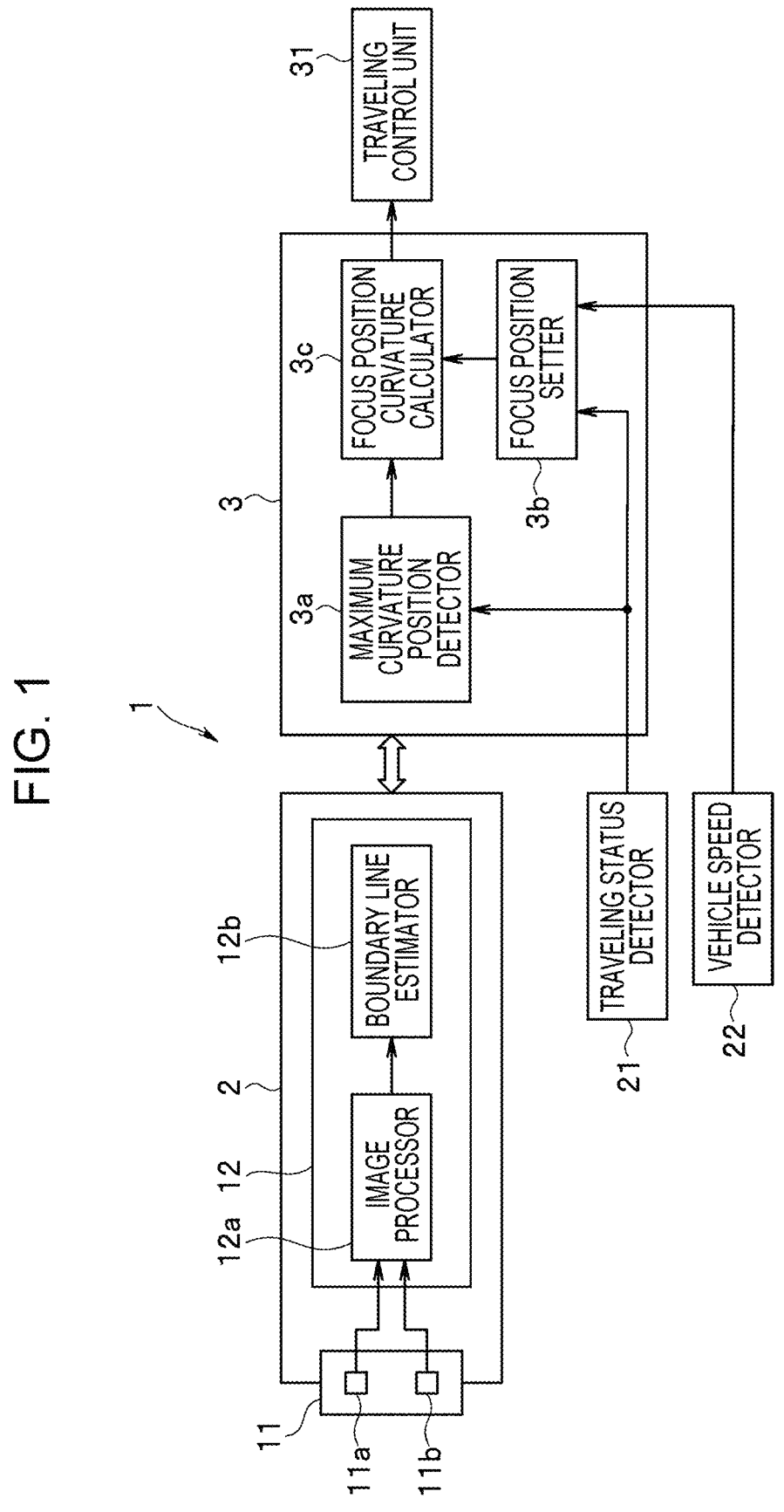
FIG. 1 is a functional block diagram of a road curvature estimation device according to a first embodiment.

FIGS. 1 to 5 illustrate a first embodiment of the disclosure. In FIG. 1, a road curvature estimation device 1 is mounted on a vehicle M illustrated in FIG. 5. The road curvature estimation device 1 includes a camera device 2 and a curvature calculation device 3. The camera device 2 and the curvature calculation device 3 are coupled to communicate with each other.

The camera device 2 includes an image capturer 11 and a road shape estimator 12. Each of the road shape estimator 12 and the curvature calculation device 3 is, for example, a microcontroller including a CPU, a RAM, a ROM, a rewritable non-volatile memory (flash memory or EEPROM), and peripheral devices. The RAM serves as a working area for the CPU and temporarily stores various types of data for the CPU. The ROM stores programs, fixed data, etc. for processes to be performed by the CPU. The CPU is also referred to as "microprocessor (MPU)" or "processor". A graphics processing unit (GPU) or a graph streaming processor (GSP) may be used in place of the CPU. The CPU, the GPU, and the GSP may be combined selectively.

The image capturer 11 is a stereo camera including a main camera 11a and a subcamera 11b. The two cameras 11a and 11b are installed, for example, horizontally with a predetermined based length above a rearview mirror at the center in a vehicle width direction near a windshield. The cameras 11a and 11b include imaging elements such as a CCD or a CMOS, and both the imaging elements capture an image of a traveling environment ahead of the vehicle, including a lane where the vehicle M is traveling.

The image capturer 11 obtains reference image data by the main camera 11a and comparative image data by the subcamera 11b. The two cameras 11a and 11b capture images at a preset frame rate (e.g., 30 to 60 (fps)).

The road shape estimator 12 includes an image processor 12a and a boundary line estimator 12b. The image processor 12a processes images captured by the two cameras 11a and 11b of the image capturer 11 and showing a road shape etc. by known stereo matching or filtering. Image data including distance information is generated based on the captured image subjected to the predetermined image processing.

Figures 10A, 10B:
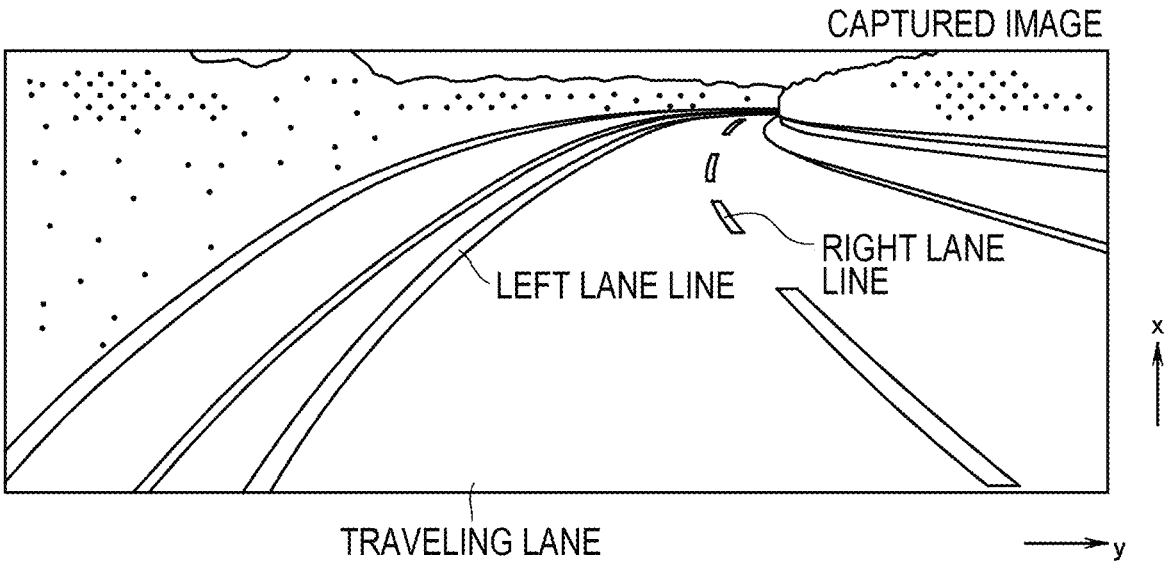
FIG. 10A illustrates a captured image showing a view ahead of a vehicle.
FIG. 10B illustrates an image of boundary lines estimated by machine learning from FIG. 10A.

The boundary line estimator 12b identifies a traveling lane and lane lines by using machine learning such as a neural network based on pieces of image data of one frame generated by the road shape estimator 12, and generates image data indicating estimated boundary line areas between the traveling lane and the lane lines (estimation image) (see FIGS. 10B and 11B). Then, curvatures $\rho 1, \rho 2, \ldots, \rho n$ (1/R) are calculated for individual boundary line positions (X1, X2, ..., Xn (m)]) at predetermined distances from a curve entrance on each boundary line (see FIG. 5).

Figure 5:
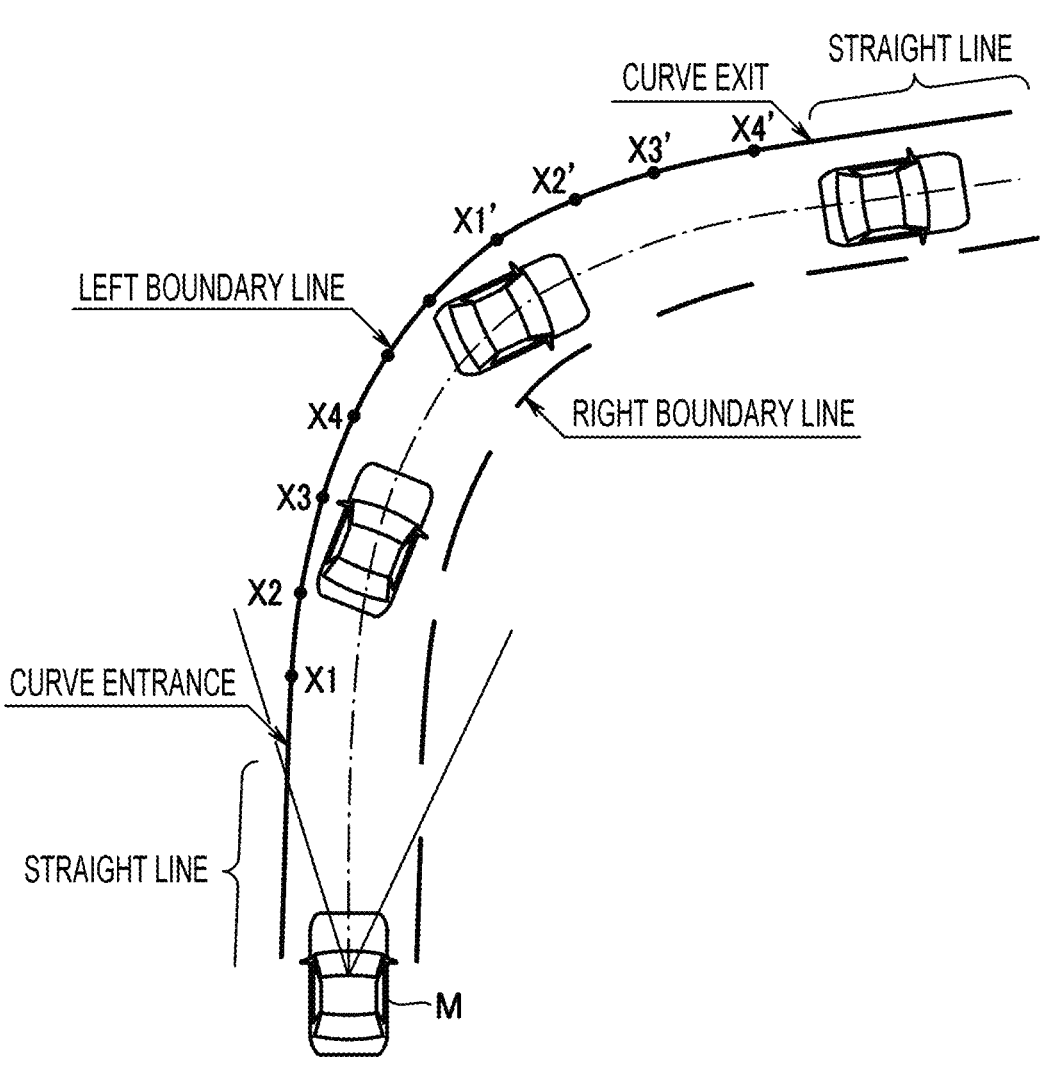
FIG. 5 is a bird's eye view illustrating how the maximum curvature position is detected at the time of entry to a curved road according to the first embodiment.

Data on the calculated curvatures is transmitted to the curvature calculation device 3. In FIG. 5, as the boundary line positions, four points X1=30, X2=40, X3=50, and X4=60 (m) are simply set forward from the curve entrance and four points X1'=30, X2'=40, X3'=50, and X4'=60 (m) are set in a direction from a constant curvature area to a curve exit via a gentle curve area. However, this is illustrative and the curvatures are calculated for finer boundary line positions in actuality.

The curvature calculation device 3 includes a maximum curvature position detector 3a, a focus position setter 3b, and a focus position curvature calculator 3c. A traveling status detector 21 is coupled to the maximum curvature position detector 3a and the focus position setter 3b. A vehicle speed detector 22 is coupled to the focus position setter 3b.

A traveling control unit 31 is coupled to an output side of the focus position curvature calculator 3c. The traveling control unit 31 is a generic term of a power controller that controls power from a power unit such as an engine or an electric motor, a steering controller that controls and operates a steering wheel, and a brake controller that forcibly reduces the vehicle speed.

The traveling status detector 21 detects a traveling status of the vehicle M. For example, the traveling status detector 21 detects the traveling status as to whether the vehicle M is traveling along a straight road or a curve by checking a vehicle position detected based on a positioning signal from the global navigation satellite system (GNSS) that is an external signal against road map information in a car navigation system. The vehicle speed detector 22 detects a current vehicle speed of the vehicle M. Examples of the vehicle speed detector 22 include a vehicle speed sensor.

The maximum curvature position detector 3a detects a position of the maximum curvature based on curvatures calculated for predetermined positions on a boundary line calculated by the boundary line estimator 12b of the camera device 2.

Figure 2:
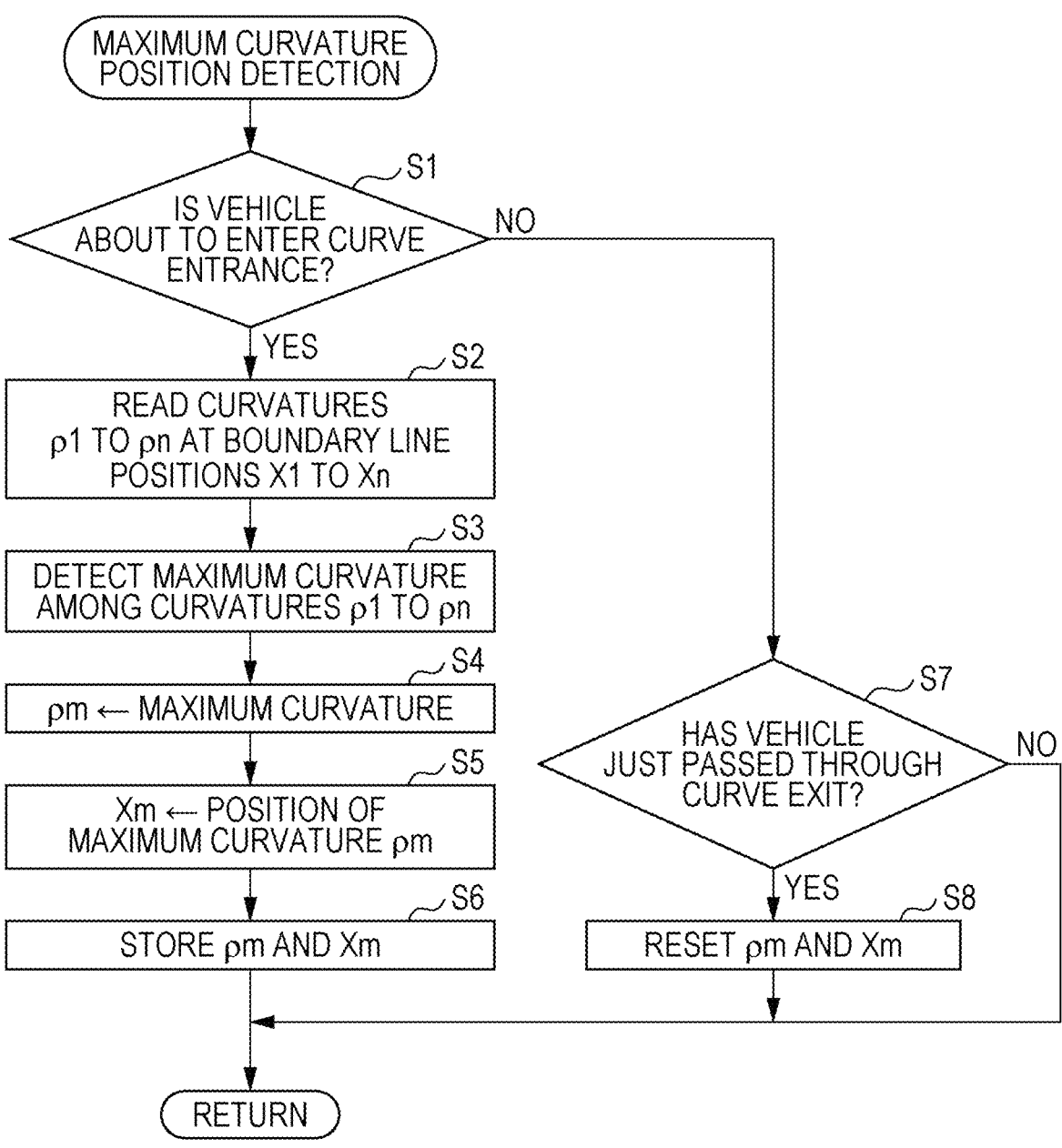
FIG. 2 is a flowchart illustrating a maximum curvature position detection routine according to the first embodiment.

For example, the maximum curvature position is detected in accordance with a maximum curvature position detection routine illustrated in FIG. 2. In this routine, determination is made as to whether the vehicle M is about to enter a curve entrance (Step S1). Whether the vehicle M is about to enter the curve entrance is determined based on map information in the car navigation system (not illustrated). Alternatively, the determination may be made based on a captured image processed by the image processor 12a of the camera device 2. The state in which the vehicle M is about to enter the curve entrance means that the vehicle M is about 10 to 30 (m) behind the curve entrance. The distance at which the vehicle M is about to enter the curve entrance is not limited thereto.

When the vehicle M is not about to enter the curve entrance (NO), the routine branches to Step S7. When the vehicle M is about to enter the curve entrance (YES), the routine proceeds to Step S2. In Step S2, the curvatures $\rho1$, $\rho2$, . . . , $\rho n$ (1/R) at the boundary line positions (X1, X2, . . . , Xn (m)) calculated by the boundary line estimator 12b are read. The curvatures $\rho1$, $\rho2$, . . . , $\rho n$ (1/R) may be weighted with a predetermined value. By weighting the curvatures $\rho1$, $\rho2$, . . . , $\rho n$ (1/R), a curvature at a longer distance can easily be detected as the maximum value in Step S3. Alternatively, a curvature at a nearer boundary line position can easily be detected as the maximum value in Step S3 by weighting the curvatures $\rho1$, $\rho2$, . . . , $\rho n$ (1/R).

Subsequently, the maximum curvature is detected among the curvatures (Step S3). As illustrated in FIG. 10A, many curves extend from a straight area to a constant curvature area indicating the maximum curvature via a gentle curve area. When a boundary line set on the curve is estimated by using machine learning based on pieces of image data of one frame, the boundary line is a trajectory similar to the lane line as illustrated in FIG. 10B.

As illustrated in FIG. 11A, the lane line from the gentle curve area to the constant curvature area on the curve may be hidden by an obstacle such as a preceding vehicle or an oncoming vehicle. When a boundary line on the curve is estimated by using machine learning based on pieces of image data of one frame, the contour on the side of the preceding vehicle or the oncoming vehicle may erroneously be recognized as the boundary line as indicated by the portion enclosed by the chain line circle in FIG. 11B. If the curvature is calculated based on the erroneously recognized boundary line, the curvature of this portion is small and therefore the curvature is maximum in the gentle curve area.

The calculated maximum curvature is set as a maximum curvature $\rho m$ (Step S4). The boundary line position of the maximum curvature $\rho m$ is set as a maximum curvature position Xm (Step S5). The maximum curvature $\rho m$ and the boundary line position Xm are stored in the memory and the routine is terminated.

In Step S7 branching from Step S1, determination is made as to whether the vehicle M has just passed through a curve exit. Whether the vehicle M has just passed through the curve exit is determined based on the traveling status detected by the traveling status detector 21. Alternatively, whether the vehicle M has just passed through the curve exit may be determined when the curvature at the boundary line position X1' gradually decreases and then X1'=0 (1/R) is detected.

When determination is made that the vehicle M has just passed through the curve exit (YES), the routine proceeds to Step S8. When determination is made that the vehicle M is traveling along the curved road or along a traveling road after passing through the curve exit (NO), the routine is terminated. In Step S8, the maximum curvature $\rho m$ and the boundary line position Xm stored in the memory are reset and the routine is terminated.

The focus position setter 3b sets a focus position on the boundary line based on a vehicle speed of the vehicle M immediately behind the curve entrance (entry vehicle speed). The focus position is, for example, a focus point for feedforward control in the steering control. The steering control has a specific response delay. Therefore, focus is put on a position at a longer distance as the vehicle speed at the time of entry to the curve increases.

Figure 3:
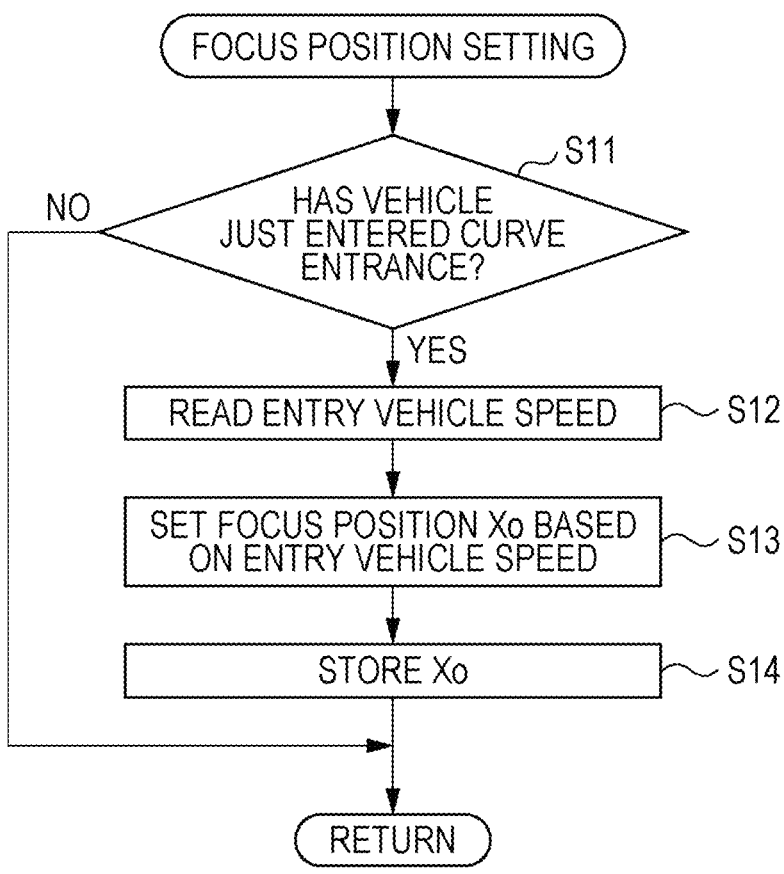
FIG. 3 is a flowchart illustrating a focus position setting routine according to the first embodiment.
Figure 4:
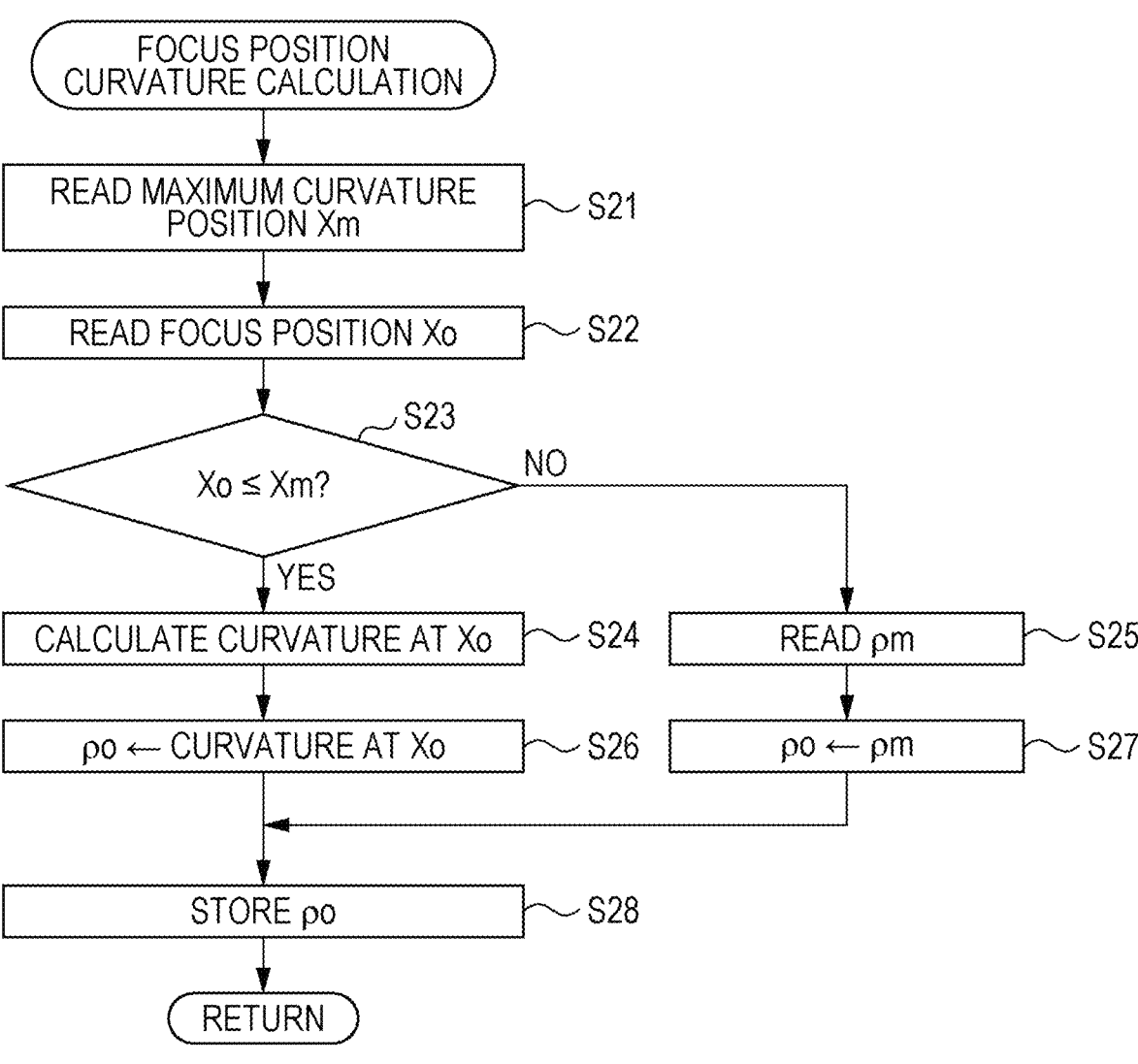
FIG. 4 is a flowchart illustrating a focus position curvature calculation routine according to the first embodiment.

For example, the focus position setter 3b sets the focus position in accordance with a focus position setting routine illustrated in FIG. 3. When this routine is started, determination is made as to whether the vehicle has just entered the curve entrance (Step S11). Whether the vehicle has just entered the curve entrance is determined based on the traveling status detected by the traveling status detector 21.

When determination is made in Step S11 that the vehicle has just entered the curve entrance (YES), the routine proceeds to Step S12. When determination is made that the vehicle has not just entered the curve entrance (NO), the routine is terminated.

Figure 6:
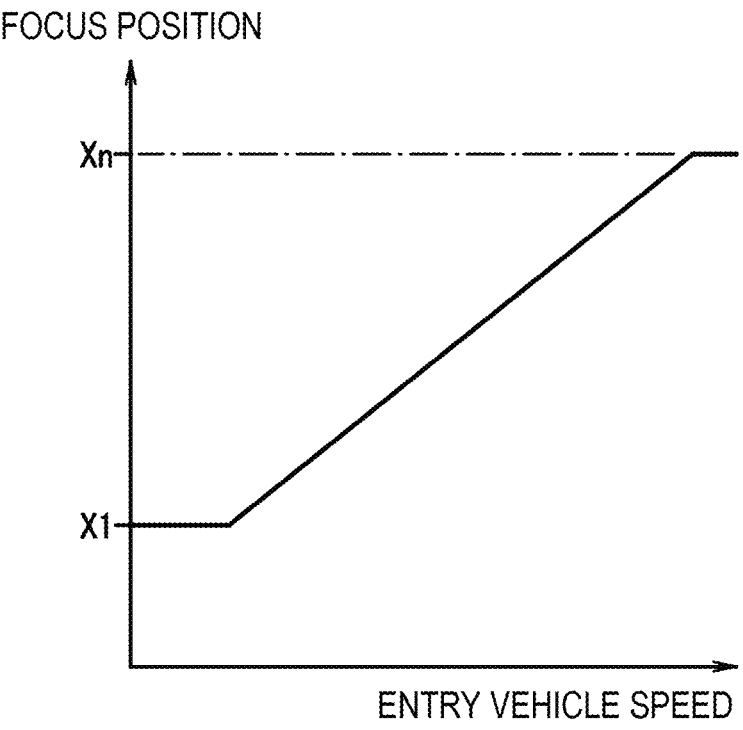
FIG. 6 is a conceptual diagram of a focus position setting table.

In Step S12, the vehicle speed at the time of entry to the curve (entry vehicle speed) detected by the vehicle speed detector 22 is read. In Step S13, a focus position Xo on the boundary line ahead of the vehicle M is set based on the entry vehicle speed. The focus position Xo is set by referring to a focus position setting table. FIG. 6 illustrates the concept of the focus position setting table. The focus position Xo is, for example, a focus point for the feedforward control in the steering control. The steering control has a specific response delay. Therefore, the focus position is set at a longer distance as the entry vehicle speed increases in the focus position setting table. The relationship between the entry vehicle speed and the focus position is preset through experiment etc. Then, the set focus position Xo is stored in the memory and the routine is terminated (Step S14).

The focus position curvature calculator 3c determines a curvature at the focus position Xo on the boundary line set by the focus position setter 3b. For example, the focus position curvature calculator 3c determines the curvature at the focus position Xo in accordance with a focus position curvature calculation routine illustrated in FIG. 4.

When this routine is started, the boundary line position Xm of the maximum curvature $\rho m$ detected by the maximum curvature position detector 3a is read (Step S21). The focus position Xo set by the focus position setter 3b is read (Step S22).

The focus position curvature calculator $3c$ compares the focus position Xo and the boundary line position Xm (Step S23). When Xo≤Xm (YES), the routine proceeds to Step S24. When Xo>Xm (NO), the routine branches to Step S25.

In Step S24, the focus position curvature calculator $3c$ calculates the curvature at the focus position Xo, and the routine proceeds to Step S26. For example, the routine proceeds to Step S24 when the boundary line position Xm of the maximum curvature ρm is X3 and the focus position Xo is X2 or X3 in FIG. 5. The routine branches to Step S25 when the boundary line position Xm of the maximum curvature ρm is X3 and the focus position Xo is the boundary line position X4 due to the erroneous recognition of the boundary line.

For example, when the boundary line position Xm of the maximum curvature ρm is the boundary line position X4 and the focus position Xo is any one of the boundary line positions X1 to X4 in FIG. 5, the focus position curvature calculator $3c$ directly applies a corresponding one of the curvatures ρ1 to ρ4 calculated by the boundary line estimator $12b$ as the curvature at the focus position Xo.

For example, when the boundary line position Xm of the maximum curvature ρm is X3 and the focus position Xo is a position between the boundary line positions X3 and X4 in FIG. 5, the curvature at the boundary line position X3 is set as the curvature at the focus position Xo. When the boundary line position Xm of the maximum curvature ρm is X3 and the focus position Xo is a position between X2 and X3, the curvature at the focus position Xo is calculated by linear interpolation between the curvature ρ2 at the boundary line position X2 and the curvature ρ3 at the boundary line position X3.

In Step S26, the curvature at the focus position Xo calculated in Step S24 is set as a focus position curvature ρo, and the routine proceeds to Step S28.

In Step S25 branching from Step S23, the maximum curvature ρm is read. Then, the maximum curvature ρm is set as the focus position curvature ρo (Step S27), and the routine proceeds to Step S28.

In Step S28 from Step S26 or S27, the focus position curvature ρo is stored in the memory and the routine is terminated.

The focus position curvature ρo is read by the traveling control unit 31. At the time of entry to the curve entrance, the traveling control unit 31 sets a target vehicle speed for passage through the focus position Xo based on the entry vehicle speed and the focus position curvature ρo. The traveling control unit 31 operates to control the vehicle M to smoothly pass through the curve.

In this embodiment described above, the boundary line position Xm of the maximum curvature ρm is first determined for calculation of the curvature of the boundary line on the curve. The curvature ρo at the focus position Xo (focus position curvature) is set with the maximum curvature ρm at the boundary line position Xm as an upper limit. Thus, when setting the curvature of the road by using machine learning based on pieces of image data of one frame, the curvature of the boundary line at a longer distance can be estimated with stable accuracy even if the lane line at a distant point is hidden by and becomes unclear due to an obstacle such as a preceding vehicle or an oncoming vehicle and the boundary line is erroneously recognized.

Figure 7:
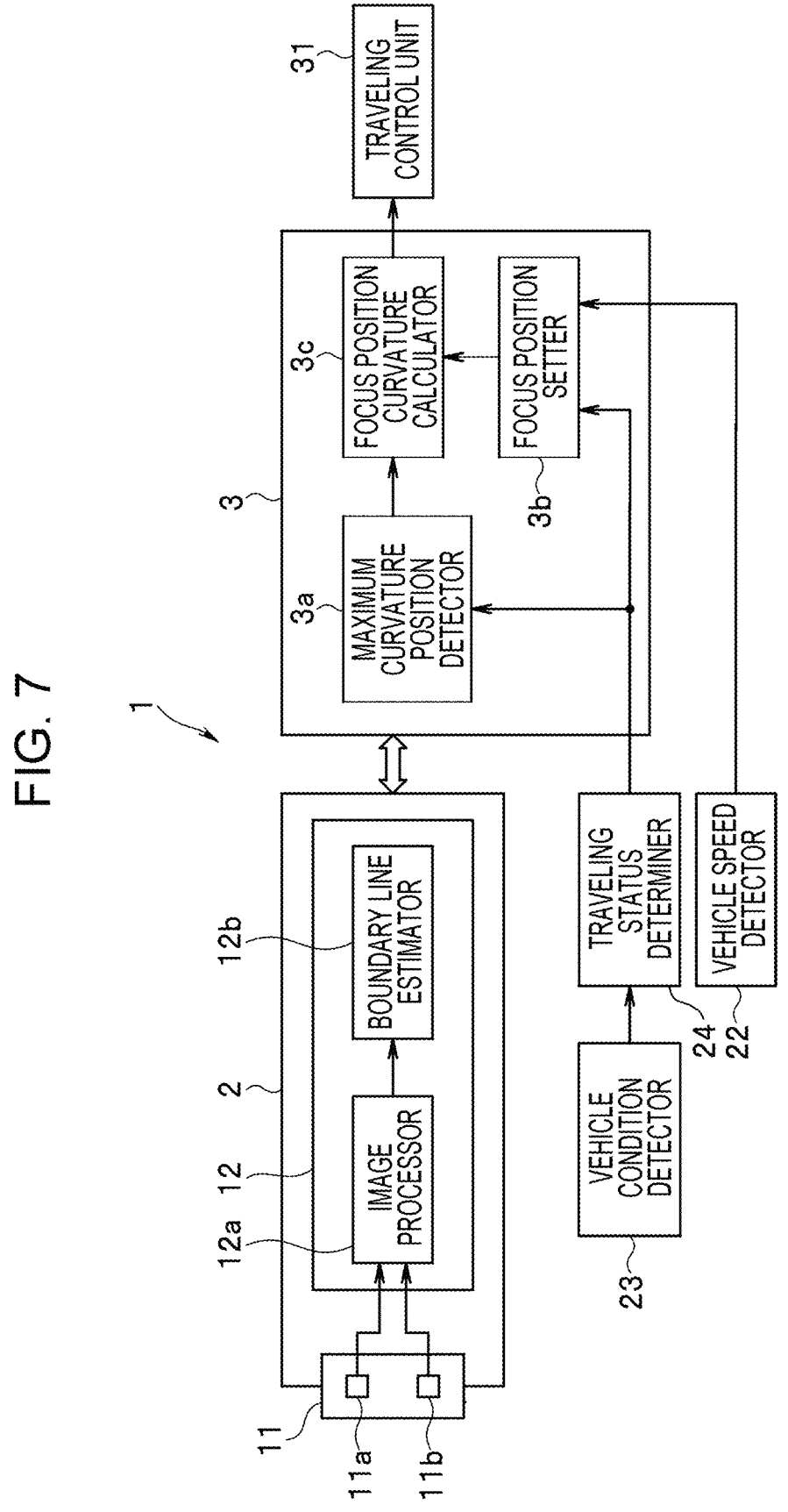
FIG. 7 is a functional block diagram of a road curvature estimation device according to a second embodiment.

FIG. 7 illustrates a second embodiment of the disclosure. In this embodiment, a traveling status determiner 24 determines whether the vehicle M is traveling along a straight road or a curve based on a vehicle condition detected by the vehicle condition detector 23. The camera device 2, the curvature calculation device 3, and the vehicle speed detector 22 have the same configurations as those in the first embodiment, and description thereof is therefore omitted.

The vehicle condition detector 23 is mounted on the vehicle M in advance. The vehicle condition detector 23 detects the behavior of the vehicle M, and is a steering wheel angle sensor, a yaw rate sensor, a lateral acceleration sensor, etc.

When the vehicle condition detector 23 is the steering wheel angle sensor and the steering wheel angle detected by the steering wheel angle sensor increases from a neutral position, the traveling status determiner 24 determines that the vehicle has entered the curve entrance. When the steering wheel angle detected by the steering wheel angle sensor returns to the neutral position, the traveling status determiner 24 determines that the vehicle has passed through the curve exit.

When the vehicle condition detector 23 is the yaw rate sensor and the yaw rate detected by the yaw rate sensor increases from zero, the traveling status determiner 24 determines that the vehicle has entered the curve entrance. When the yaw rate detected by the yaw rate sensor decreases and returns to zero, the traveling status determiner 24 determines that the vehicle has passed through the curve exit.

When the vehicle condition detector 23 is the lateral acceleration sensor and the lateral acceleration detected by the lateral acceleration sensor increases from zero, the traveling status determiner 24 determines that the vehicle has entered the curve entrance. When the lateral acceleration detected by the lateral acceleration sensor returns to zero, the traveling status determiner 24 determines that the vehicle has passed through the curve exit.

The maximum curvature position detector $3a$ of the curvature calculation device 3 determines whether the vehicle has just passed through the curve exit based on the determination result from the traveling status determiner 24. The focus position setter $3b$ of the curvature calculation device 3 determines whether the vehicle has just entered the curve entrance based on the determination result from the traveling status determiner 24.

Figure 8:
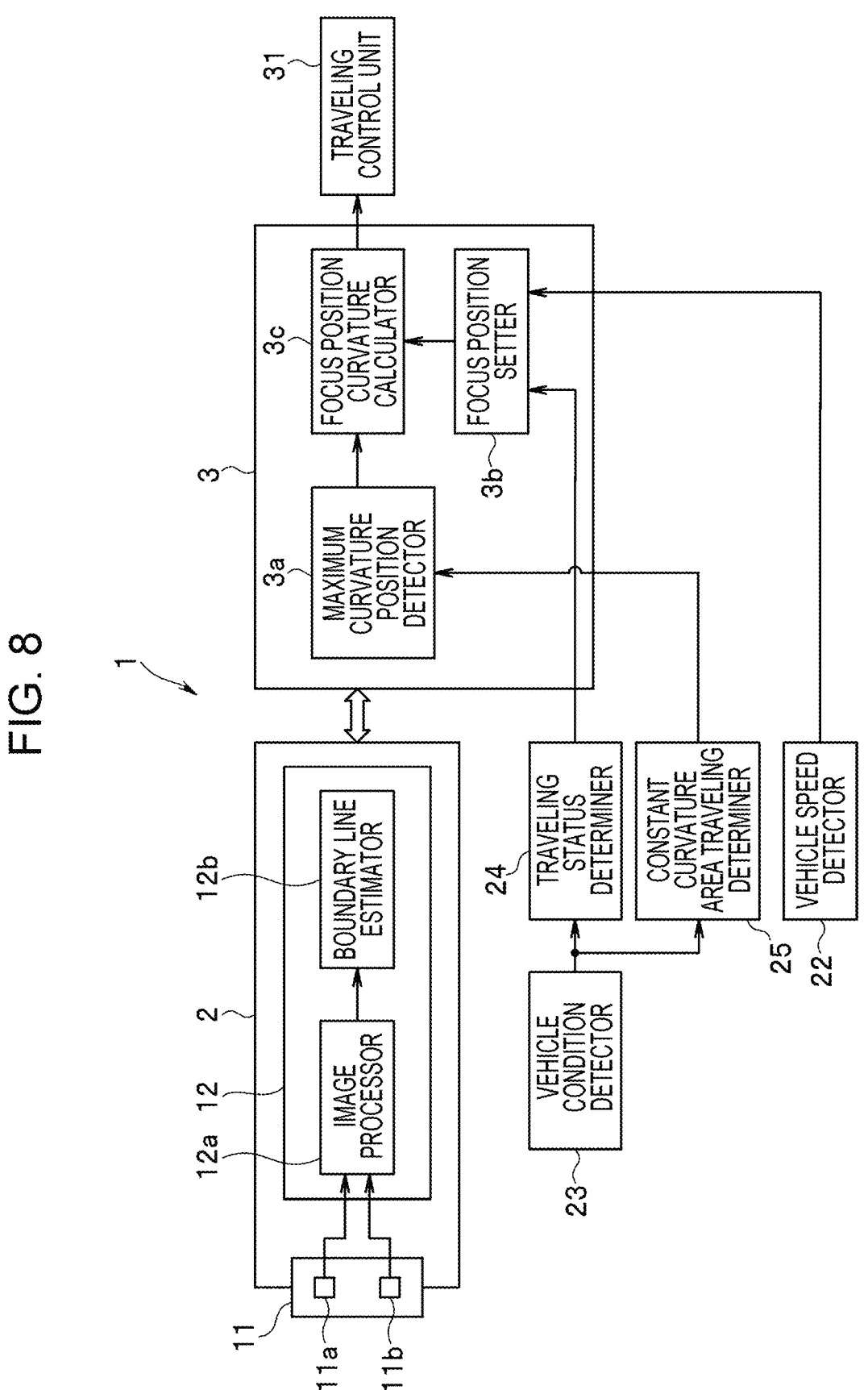
FIG. 8 is a functional block diagram of a road curvature estimation device according to a third embodiment.
Figure 9:
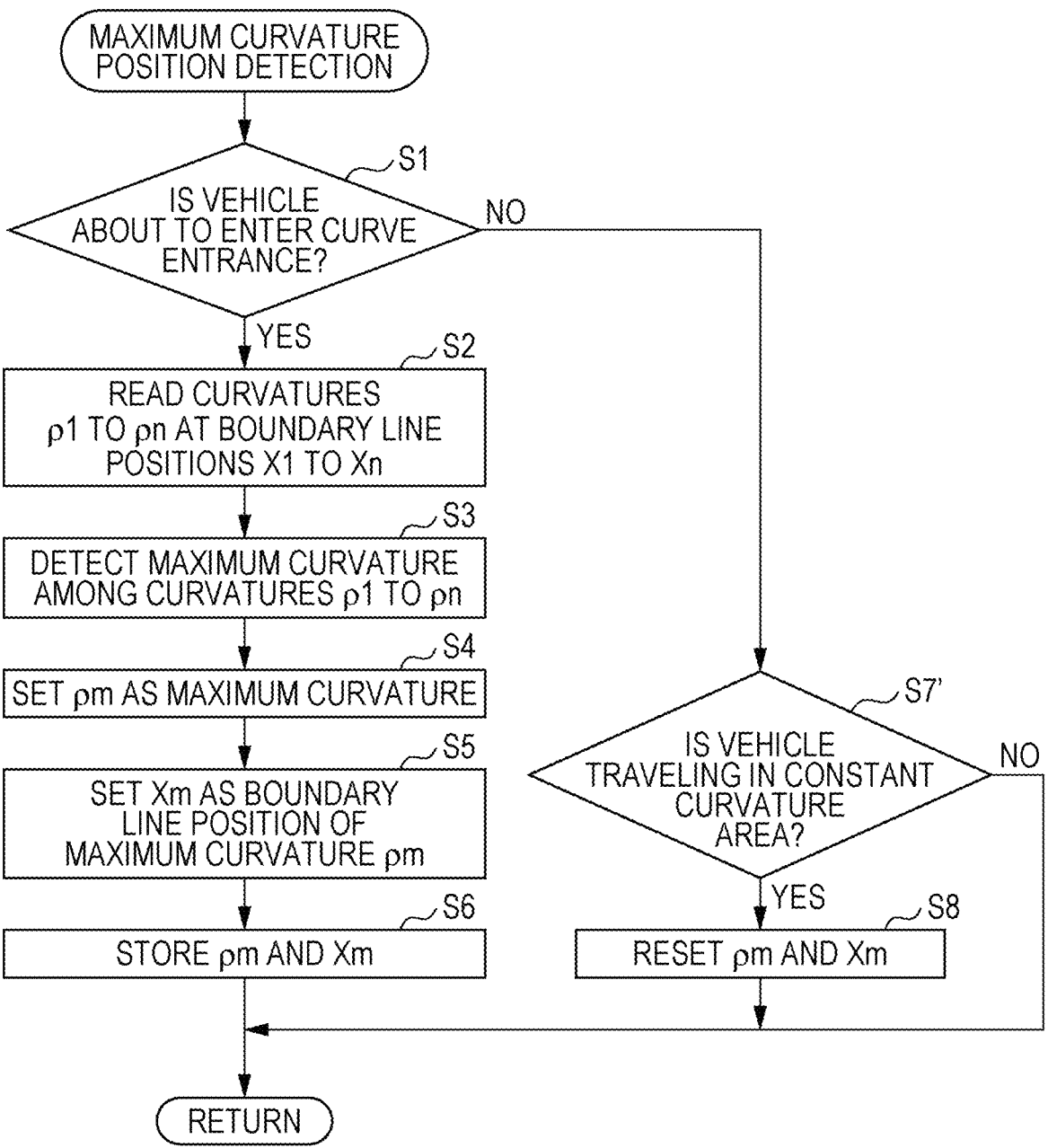
FIG. 9 is a flowchart illustrating a maximum curvature position detection routine according to the third embodiment.

FIGS. 8 and 9 illustrate a third embodiment of the disclosure. In this embodiment, a constant curvature area traveling determiner 25 is added to the configuration of the second embodiment. The camera device 2, the vehicle speed detector 22, and the focus position setter $3b$ and the focus position curvature calculator $3c$ of the curvature calculation device 3 have the same configurations as those in the first embodiment, and description thereof is therefore omitted. The vehicle condition detector 23 and the traveling status determiner 24 have the same configurations as those in the second embodiment, and description thereof is therefore omitted.

The constant curvature area traveling determiner 25 determines whether the vehicle M is traveling along the constant curvature area indicating the maximum curvature of the curve based on the vehicle condition detected by the vehicle condition detector 23. When the vehicle condition detector 23 is the steering wheel angle sensor and the steering wheel angle detected by the steering wheel angle sensor increases and becomes constant, the constant curvature area traveling determiner 25 determines that the vehicle M is traveling along the constant curvature area of the curve. When the vehicle condition detector 23 is the yaw rate sensor and the yaw rate detected by the yaw rate sensor gradually increases and exhibits a constant value, the constant curvature area traveling determiner 25 determines that the vehicle M is traveling along the constant curvature area of the curve.

When the vehicle condition detector 23 is the lateral acceleration sensor and the lateral acceleration detected by the lateral acceleration sensor increases and exhibits a constant value, the constant curvature area traveling determiner 25 determines that the vehicle M is traveling along the constant curvature area of the curve.

The determination result from the constant curvature area traveling determiner 25 is read by the maximum curvature position detector 3a of the curvature calculation device 3. The maximum curvature position detector 3a performs a maximum curvature position detection routine illustrated in FIG. 9 in place of the routine of the first embodiment illustrated in FIG. 2. In the routine, Steps S1 to S6 and S8 are the same as those in the first embodiment.

In this embodiment, a process of Step S7' is performed in place of the process of Step S7. In Step S7', determination is made as to whether the vehicle M is traveling along the constant curvature area of the curve based on the determination result from the constant curvature area traveling determiner 25.

When determination is made that the vehicle M is not traveling along the constant curvature area of the curve (NO), the routine is terminated. When determination is made that the vehicle M is traveling along the constant curvature area of the curve (YES), the routine proceeds to Step S8. The maximum curvature ρm and the boundary line position Xm stored in the memory are reset and the routine is terminated.

The maximum curvature position detector 3a detects the position of the maximum curvature of the curve. When the vehicle M passes through the constant curvature area of the curve, the curvature of the curve where the vehicle M passes gradually decreases. Thus, the position of the maximum curvature of the curve is in the area where the curvature of the curve is constant. By resetting the maximum curvature ρm and the boundary line position Xm stored in the memory when the vehicle M is traveling along the constant curvature area of the curve, the reset timing can be made earlier than those in the first and second embodiments. Thus, the load on the memory can be reduced.

Although description is omitted in the embodiments described above, the boundary line estimator 12b of the camera device 2 also estimates the boundary line between the right lane line and the traveling lane (right boundary line) by using machine learning based on pieces of image data of one frame obtained by the image capturer 11.

The boundary line estimator 12b may identify the traveling lane and the lane line based on pieces of image data of two or more frames.

According to the embodiments of the disclosure, the focus position curvature calculator compares the maximum curvature position and the focus position on the boundary line. When the focus position is closer to the vehicle than is the maximum curvature position, the curvature at the focus position is set as the focus position curvature. When the focus position is ahead of the maximum curvature position, the curvature at the maximum curvature position is set as the focus position curvature. Therefore, the road curvature can be estimated with stable accuracy based on pieces of image data of at least one frame even if the distant point is unclear.

The curvature calculation device 3 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or part of functions of the curvature calculation device 3 including the maximum curvature position detector 3a, the focus position setter 3b, and the focus position curvature calculator 3c. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or part of the functions of the modules illustrated in FIG. 1.

The invention claimed is:

1. A road curvature estimation device comprising:
   a camera device comprising:
      an image capturer configured to capture an image of a view ahead of a vehicle;
   one or more processors; and
   one or more memories storing instructions causing the one or more processors to:
      estimate a boundary line between a lane on a curve ahead of the vehicle and a right or left lane line that defines the lane, based on pieces of image data of at least one frame that are obtained by the image capturer,
      set boundary line positions on the boundary line;
      calculate respective curvatures at the boundary line positions;
      detect a maximum curvature position indicating a maximum curvature among the calculated curvatures at the boundary line positions;
      set a focus position ahead of the vehicle on the boundary line based on a vehicle speed when the vehicle enters the curve;
      compare the detected maximum curvature position and the set focus position;
      when the set focus position is closer to the vehicle than is the maximum curvature position, set a curvature at the set focus position as a focus position curvature; and
      when the set focus position is ahead of the maximum curvature position, set the curvature at the maximum curvature position as the focus position curvature.

2. The road curvature estimation device according to claim 1, wherein the one or more processors are further configured to, when the focus position is a position between ones adjacent to each other of the set boundary line positions, calculate the curvature at the focus position by linear interpolation based on curvatures at a front boundary line position and a rear boundary line position of the ones of the boundary line positions relative to the focus position.

3. The road curvature estimation device according to claim 1, wherein the one or more processors are further configured to
   store, in the one or more memories, the maximum curvature detected among the calculated curvatures at the boundary line positions, and the maximum curvature position indicating the maximum curvature, and
   reset the maximum curvature and the maximum curvature position stored in the one or more memories when the vehicle has passed through an exit of the curve or when the vehicle has traveled along a constant curvature area of the curve.

4. The road curvature estimation device according to claim 3, wherein whether the vehicle has passed through the exit of the curve or whether the vehicle has traveled along the constant curvature area of the curve is determined based on behavior of the vehicle.

5. The road curvature estimation device according to claim 1,
   wherein the focus position is set at a longer distance as the vehicle speed increases.

6. The road curvature estimation device according to claim 2,
   wherein the focus position is set at a longer distance as the vehicle speed increases.

7. The road curvature estimation device according to claim 3,
   wherein the focus position is set at a longer distance as the vehicle speed increases.

8. The road curvature estimation device according to claim 4,
   wherein the focus position is set at a longer distance as the vehicle speed increases.

9. A road curvature estimation device comprising:
   a camera configured to capture an image of a view ahead of a vehicle; and
   circuitry configured to
      estimate a boundary line between a lane on a curve ahead of the vehicle and a right or left lane line that defines the lane, based on pieces of image data of at least one frame that are obtained by the camera,
      set boundary line positions on the boundary line,
      calculate respective curvatures at the boundary line positions,
      detect a maximum curvature position indicating a maximum curvature among the calculated curvatures at the boundary line positions,
      set a focus position ahead of the vehicle on the boundary line based on a vehicle speed when the vehicle enters the curve, compare the detected maximum curvature position and the set focus position,
      when the set focus position is closer to the vehicle than is the maximum curvature position, set a curvature at the set focus position as a focus position curvature, and
      when the set focus position is ahead of the maximum curvature position, set the curvature at the maximum curvature position as the focus position curvature.

10. The road curvature estimation device according to claim 1, wherein the focus position is set based on a predetermined relationship with the vehicle speed.

11. The road curvature estimation device according to claim 9, wherein the focus position is set based on a predetermined relationship with the vehicle speed.

12. The road curvature estimation device according to claim 9, wherein the circuitry is further configured to, when the focus position is a position between ones adjacent to each other of the set boundary line positions, calculate the curvature at the focus position by linear interpolation based on curvatures at a front boundary line position and a rear boundary line position of the ones of the boundary line positions relative to the focus position.

13. The road curvature estimation device according to claim 9, wherein the circuitry is further configured to
   store, in one or more memories, the maximum curvature detected among the calculated curvatures at the boundary line positions, and the maximum curvature position indicating the maximum curvature, and
   reset the maximum curvature and the maximum curvature position stored in the one or more memories when the vehicle has passed through an exit of the curve or when the vehicle has traveled along a constant curvature area of the curve.

14. The road curvature estimation device according to claim 13, wherein whether the vehicle has passed through the exit of the curve or whether the vehicle has traveled along the constant curvature area of the curve is determined based on behavior of the vehicle.

* * * * *